United States Patent [19]

Shell

[11] Patent Number: 5,307,751

[45] Date of Patent: May 3, 1994

[54] DEVICE FOR RELEASEABLY CONNECTING ROPE ENDS IN TENSION

[76] Inventor: David Shell, 500 Rancho Dr., San Marcos, Calif. 92069

[21] Appl. No.: 909,104

[22] Filed: Jul. 2, 1992

[51] Int. Cl.⁵ ............................................. B63B 21/04
[52] U.S. Cl. ..................................... 114/218; 24/130
[58] Field of Search ................. 114/218; D8/382, 389; 24/129 R, 130

[56] References Cited

U.S. PATENT DOCUMENTS

| 757,820 | 4/1904 | Lykke | 24/130 |
| 2,048,300 | 7/1936 | Showers | 24/130 |

FOREIGN PATENT DOCUMENTS 1010686  11/1965  United Kingdom ................. 24/130

*Primary Examiner*—Jesûs D. Sotelo
*Attorney, Agent, or Firm*—Frank D. Gilliam

[57] ABSTRACT

A compact, cleat-like, device for connecting the ends of a rope together where the rope is in tension. The device is generally planar, with two approximately flat surfaces, two approximately parallel sides and trifurcated ends. A central aperture is provided through the flat surfaces. The channels between the three end fingers are tapered, with the apices extending toward the aperture. In use, rope ends are inserted through the aperture, wrapped around two opposite channels and inserted back through the aperture. The device safely and securely maintains the connection between the rope ends. The rope can be easily removed, even with the rope in tension, by pulling one end of the rope back through the eye and unwrapping it from the channels.

12 Claims, 1 Drawing Sheet

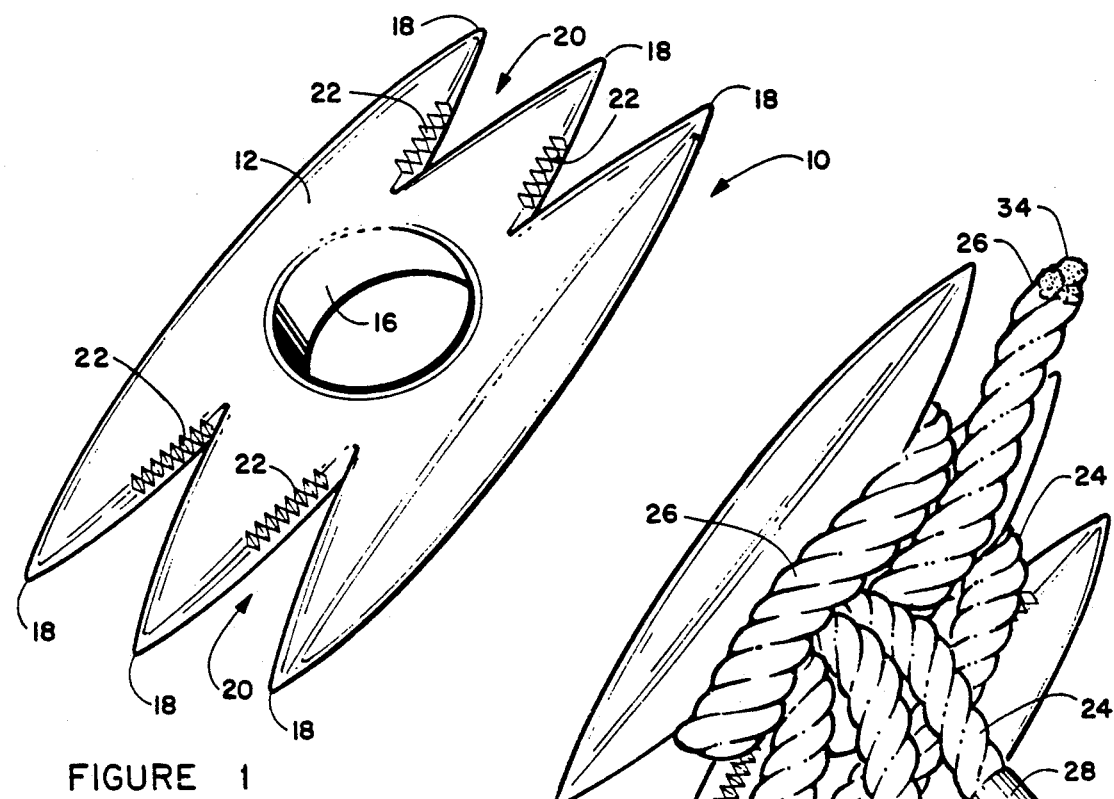
FIGURE 1
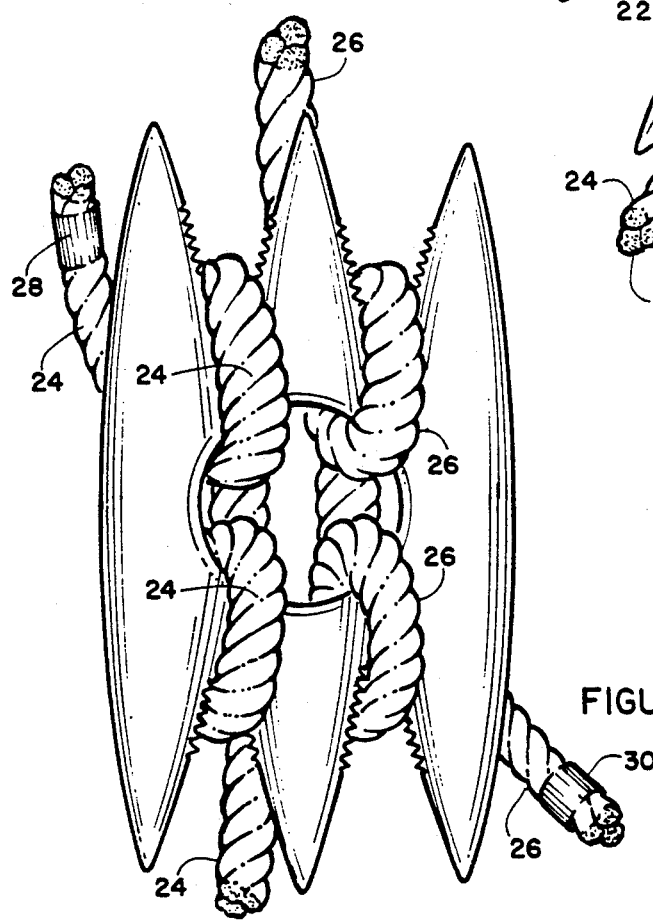
FIGURE 2
FIGURE 3

DEVICE FOR RELEASEABLY CONNECTING ROPE ENDS IN TENSION

BACKGROUND OF THE INVENTION

This invention relates in general to a device for connecting the ends of a rope or the like together and, more particularly to a cleat-like device for permitting rapid and easy connection and disconnection of the ends of a rope.

A wide variety of devices and methods have been used to connect two ends of a rope together or to connect a rope to a structure. Typically, the rope may be used to tie down a container to the bed of a truck or the like, with the rope in tension at the connection. The most common method is to use one of many knots to tie the rope ends together or to a structure. While often effective, skill in tieing the knot and proper selection of a particular knot configuration for a particular purpose is required. Poorly tied knots, or the use of an incorrect knot may allow the knot to slip or may the knot very difficult to untie. Also, tieing a knot while maintaining proper tension in the rope is often difficult.

Because of these problems with knots, a number of mechanical devices have been developed to assist in connecting rope ends together or to structures. The most common device for connecting ropes to structures is the conventional cleat, which is firmly attached to the structure at its midpoint and has two ends or horns around which the rope is wound and tied. While very effective when used correctly, cleats are not suitable for connecting the ends of ropes together, where the rope is in tension. Cleats may have eyes for tieing ropes, such as is disclosed by Matthews in U.S. Pat. No. 3,948,203, or may include multiple hooks around which the rope can be wrapped, such as is disclosed by Newell in U.S. Pat. No. 3,715,782. Wires and other projections are sometimes added to cleats to improve capture of the rope by wedging the rope into wedge-shaped openings, as disclosed by Tuttle in U.S. Pat. No. 4,690,090. A particularly effective cleat-like device for connecting a rope to a structure is described in my copending U.S. patent application, Ser. No. 07/686,050, filed Apr. 16, 1991. While generally useful in connecting ropes to a structure, these devices are not well adapted to connecting rope ends together where the rope is in tension.

Generally, rope ends have been secured together with knots, with the disadvantages mentioned above. Attempts have been made to provide simple devices, such as metal plates with a plurality of holes through which the rope ends are threaded in serpentine fashion. These plates, often used with tent lines and the like, rely on friction between the rope and hole edges and often slip. While acceptable where occasional slippage is acceptable, they are not acceptable for such applications as holding cargo to a truck bed where slippage could be disastrous. These devices are also difficult to release where the rope is under considerable tension.

Thus, there is a continuing need for improved devices to aid in connecting the ends of ropes together, overcoming the prior problems of connection slippage, difficulty in making the connection, the requirement for considerable skill in making an acceptable connection and difficulty in releasing the connection when desired with the rope under tension.

SUMMARY OF THE INVENTION

The above-noted problems, and others, are overcome by the rope connection device of this invention, which basically comprises a compact cleat-like planar device having two opposed generally flat surfaces with two generally parallel sides and two opposed trifurcated ends. A central aperture extends through the device, through the flat surfaces. The three fingers at each end have channels therebetween that narrow toward the central aperture.

The device can be formed from any suitable material having the required strength characteristics. While the device may be formed from metal, various high strength plastics, formed typically by injection molding, are preferred for ease and economy of manufacturing and freedom from corrosion. While any suitable plastic may be used, NYLON, DELRON, polypropropylene, polyethylene and mixtures thereof are preferred. The plastics may incorporate reinforcing fibers, typically glass, aramid or graphite fibers or mixtures thereof.

Thus, an object of this invention is to provide a device for connecting the ends of ropes which overcome the problems mentioned above. Another object is to provide a simple, compact and effective device for connecting rope ends, the use of which does not require extensive training or high skill levels. A further object is to provide a rope connection device that can be easily installed and removed with the rope in tension.

BRIEF DESCRIPTION OF THE DRAWING

Details of the invention, and of certain preferred embodiments thereof, will be further understood upon reference to the drawing, wherein:

FIG. 1 is a perspective view of the rope connection device of this invention;

FIG. 2 is a front elevation view of the device with rope in place; and

FIG. 3 is a back elevation view of the device with rope in place.

DETAILED DESCRIPTION OF PREFERRED EMBODIMENTS

Referring now to FIG. 1, there is seen a rope connection device 10 which is preferably generally planar and roughly rectangular in over all configuration. The front and back surfaces are approximately parallel, except that the ends tend to taper in thickness. Sides 12 and 14 are approximately parallel, often with a slightly convex curve. An aperture 16 is provided at or near the center of the surfaces to receive the ends of a rope, as detailed below. The ends of device 10 are trifurcated, with the three fingers substantially pointed at their distal ends having channels 20 between them narrowing to apices extending toward aperture 16. The inner walls of these channels 20 preferably have transverse serrations 22 to aid in griping a rope wedged into the channel. Ordinarily, however, the wedging effect is sufficient to hold a rope in place even in the absence of serrations 22.

FIGS. 2 and 3 show the front and back of a connection device 10 with two rope ends in place. Rope 24 is shown with a heavier outline than rope 26 to aid in distinguishing the two ropes. The ends of ropes 24 and 26 are wrapped with tape 28 and 30, respectively, to resist unraveling of the ropes. The ends 32 and 34, respectively of ropes 24 and 26, shown broken off, extend to some suitable work location.

In typical applications of the connection device 10, ends 32 and 34 may be tied to pad eyes on the bed of flat bed truck, connections along the edges of a pick-up truck box, the deck of a ship, or the like. A box or other cargo may be placed between the pad eyes and the ropes brought over the load and together. The end of the first rope 24 is brought through aperture 16, around the device and into channel 22 at each end of the device and back a through aperture 16. Rope 24 is wedged into the channels. Then, the end of second rope 26 is put through aperture 16 and pulled back to put the ropes 24 and 26 in tension. Rope 26 is wrapped around the remaining two channels 22 and back through aperture 16. The tension in the rope system, together with the wedging action of the rope into the channels positively secures the rope ends together against vibration or any other forces during vehicle movement. The ropes are easily removed by pushing the rope ends, one at a time, back through aperture and unwinding the ropes from around the channels 22. Thus, the connection device is a simple, compact and positive means for connecting the ends of a rope, or ends of two ropes together while allowing easy disconnection. Little skill is required to produce a positive connection.

Other applications, variations and ramifications of this invention will occur to those skilled in the art upon reading this disclosure. Those are intended to be included within the scope of this invention, as defined in the appended claims.

I claim:

1. A device for releaseably connecting the ends of a rope in tension which comprises;
    a generally planar cleat;
    a single central aperture through said cleat said aperture sized to allow a rope of selected size to pass therethrough four times;
    two trifurcated opposed ends extending away from said central aperture;
    each opposed end comprising three closely spaced fingers sharply pointed at their distal ends having channels therebetween, with said channels narrowing toward said aperture;
    whereby ends of a rope may be wound through said aperture and wedged into said channels in a manner restraining the rope in tension.

2. The device according to claim 1 wherein the outer edge of said opposed sides are substantially parallel.

3. The device according to claim 1 wherein said channels are substantially V-shaped.

4. The device according to claim 1 wherein the opposed edges of each channel are serrated.

5. The device according to claim 1 wherein the device is formed from a plastic selected from the group consisting of NYLON, DELRON, polypropylene, and polyethylene.

6. The device according to claim 5 wherein said plastic is reinforced with fibers comprising glass, aramid or graphite.

7. The device according to claim 1 wherein the outer edge of said opposed sides are slightly convexedly curved.

8. A device for releaseably connecting the ends of a rope in tension which comprises;
    a compact, generally planar structure having two opposite substantially flat surfaces, two approximately parallel sides and two trifurcated opposed ends;
    a single central aperture through said structure, said aperture sized to allow a rope of selected size to pass therethrough four times;
    each opposed end comprising three closely spaced, fingers extending away from said central aperture and having channels therebetween; and
    each of said channels having a V-shape with the apex extending toward said aperture;
    whereby ends of a rope may be wound through said aperture and wedged into said channels in a manner restraining the rope in tension.

9. The device according to claim 8 wherein the opposed edges of each channel are serrated.

10. The device according to claim 8 wherein the device is formed from a plastic selected from the group consisting of NYLON, DELRON, polypropylene, and polyethylene.

11. The device according to claim 10 wherein said plastic is reinforced with fibers comprising glass, aramids and graphite.

12. The device according to claim 8 wherein said two sides are slightly convexedly curved.

* * * * *